UNITED STATES PATENT OFFICE.

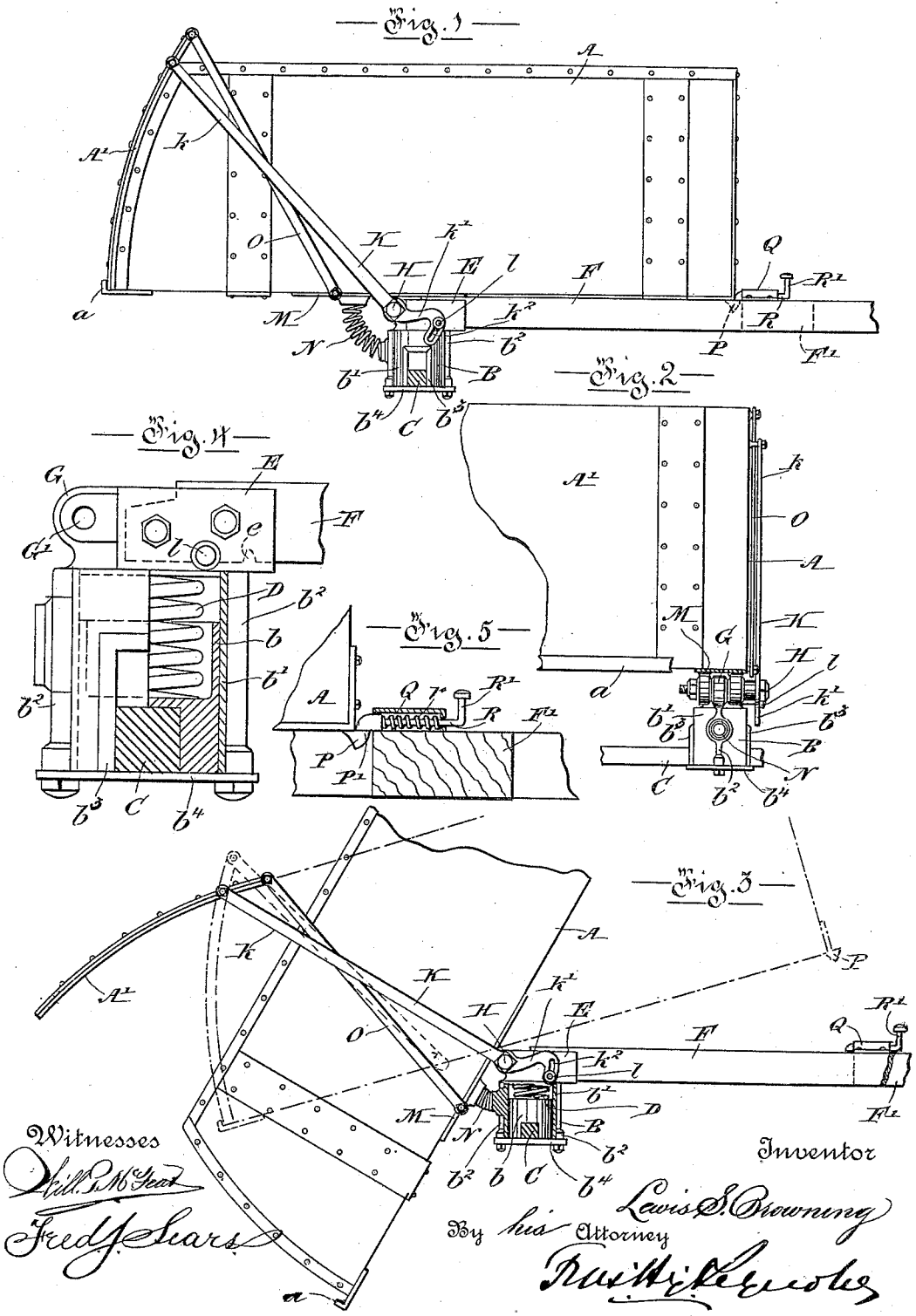

LEWIS S. BROWNING, OF MONTREAL, CANADA.

DUMPING-WAGON.

SPECIFICATION forming part of Letters Patent No. 462,090, dated October 27, 1891.

Application filed February 21, 1891. Serial No. 382,282. (No model.)

*To all whom it may concern:*

Be it known that I, LEWIS STEWART BROWNING, of the city of Montreal, in the district of Montreal and Province of Quebec, Canada, have invented certain new and useful Improvements in Dumping-Wagons; and I do hereby declare that the following is a full, clear, and exact description of the same.

My invention has for its object to produce a dumping-wagon the contents of which may be dumped and the cart refilled without the driver being required to leave the shaft. My construction will also go far to minimize the noise caused by coal and other carts when passing empty through the streets.

The parts to which my invention particularly applies are those connected with the supporting and dumping mechanism, and may be thus described: The body of the cart in its normal position rests upon two pedestals set upon the axle, which passes through them and is secured in place by a plate underneath it, bolted to the pedestals. Each pedestal is formed in two parts, the inner, which holds the spring, usually sliding inside the outer. In the top of the outer part of the pedestal is formed in front a socket for the shaft, and in the rear an ear perforated to correspond with similar ears projecting downward from the body, and through these passes a pin, which is the pivot on which the cart turns. This pin projects on each side, so as to pass through a lever, the long arm of which is connected with the tail-board and the short arm curved and slotted to receive a pin projecting from the pedestals. Curved coiled springs are connected at one end to the rear of pedestals and at the other end to plates under the cart, which in their turn are riveted to the body and connected to the tail-board by arms pivoted at both ends. A spring locking device holds the cart down upon the shafts, and when this is released it can easily be thrown over by the driver.

For full comprehension of the invention reference must be had to the annexed drawings, forming part of this specification, in which—

Figure 1 is a side view of the cart in its normal position, the wheels being in this and in all the other figures omitted for the sake of clearness; Fig. 2, a part rear view of same; Fig. 3, a side view of the cart when dumped, with outer shell of pedestal broken away, Fig. 4, a detail of pedestal, and Fig. 5 a detail of locking device.

Like symbols denote the same parts.

A is the body of the cart, usually of metal, A' being the tail-board, normally resting in a turned-up ledge $a$ at the back and operated, as will be hereinafter described, by means of levers.

B B are the pedestals, mounted, as shown, on the axle C and formed, as illustrated in Fig. 4, with an inside shell $b$, within which is placed the spring D, and an outside shell $b'$, re-enforced on all four sides, as at $b^2$ $b^3$, to form a bearing for the axle and to sustain the pedestal.

$b^4$ is a plate under the axle and the pedestal and bolted to the latter to hold the former and the inside shell in place.

In the upper forward side of each pedestal and immediately under the cart is formed a socket E to receive the inner end of the shaft F, which is kept in place by bolts and is further secured by a ridge $e$ running across the inside. It will be apparent from the location of the spring-pedestals directly between the axle, on the one hand, and the shafts, body, and the locking-bar connection which go to form a rigid whole, on the other, that all chance of rattling is avoided, and this with a much simpler construction than heretofore. In the rear of this socket is formed, as shown in Figs. 2 and 4, an ear or projection G, perforated at G' to allow of the passage through it of the pivot-spindle H, thus bringing the pivot-point as nearly as possible over the point of support. This spindle H passes through and forms on each side of the cart the pivot-point of a lever K, mounted on same, the long arm $k$ of which is straight and connected with the tail-board at a point somewhat below its upper edge, the short arm $k'$ being bent and returned (on a curve struck from the pivot-point H) and slotted, as shown at $k^2$, to receive a pin $l$, projecting from the outside of the pedestal.

M M are plates secured to the under side of the cart, between which and the rear of the pedestal are interposed curved coiled springs N. O O are levers or arms pivoted at one end to the plate M and at the other end to the tail-board A'.

The device preferred to hold the cart normally in position, the detachment of which allows it to be dumped, is shown in Fig. 5. It is partially secured to the front of the cart A and partly mounted on the cross-bar F' of the shafts. To A is secured a stop P, (which may have a spring behind it,) projecting, as at P', under the cart both forward and backward. Q is a sleeve mounted on F', in which moves a bar R, with spring $r$ wound round it, turned up at the end, as at R'. Although this device will be found very efficient for the purpose, I do nor confine myself absolutely to its use, and any equivalent mechanism may be employed.

The operation of my cart for dumping is as follows: The driver, without moving from the shaft, by a pressure of his foot releases the bar R from contact with the stop P', thus leaving the body A free to move, and by a slight push it can be turned on the pivot H, the load falling more and more to the rear and the tension of the spring N when drawn over the center helping to draw down the rear end of the cart. After this these springs act as compression-springs and save all jar. The levers K will turn on the pivot-pin H until the pin $l$ assumes in the slot $k^2$ the position shown in Fig. 3, at which both the lever and pin will remain. As the distance between the pivot-point H and the point of attachment of the lever K to the tail-board A' must be invariable, the further depression of the rear of the cart will by means of the levers O throw the tail-board upward and forward until it assumes the position shown in Fig. 3, at which time the contents of the cart are dumped. When relieved from the weight of the contents, the action of the springs N N will raise the rear end of the cart, and thereby, through the arms O O, bring the tail-board backward and downward till it falls into place, as shown in dotted lines in Fig. 3, and in this position the cart is filled from the rear. When filled, the body of the cart will, either by itself or with the slightest effort on the part of the driver, drop into position and be secured there by the self-locking bar R engaging with the stop P.

What I claim is as follows:

1. In a dumping-cart, the combination, with the body, shafts, and axles, of pedestals formed of upper and lower telescopic casings, and spiral springs contained therein, the said body and shafts being connected to the upper casing, the former pivotally, and the lower casing to the axle, as shown and described.

2. In a dumping-cart, the combination, with the body and axle, of spring-pedestals interposed between the axle and the body, resting on the former and pivoted at their rear faces to the latter and having sockets formed in their front to receive the ends of the shafts, all as herein set forth.

3. In a dumping-cart, the combination, with the body of the cart and spring-pedestals placed under same, carried by the axle and carrying the ends of the shafts, of a pivot-spindle passing through pedestals, and ears projecting downward from body of cart, and a locking device securing body to shafts, all substantially as herein set forth.

4. In a dumping-cart, the combination, with spring-pedestals interposed between the body and the axle, and the pivot-pin carried in such pedestals, of levers K, mounted on such pivot-pin, with long arms connected with tail-board of cart, and short arms slotted to receive pins projecting from pedestals, all as herein set forth.

5. In a dumping-cart, the combination, with the body, of spring-pedestals interposed between it and the axle, levers K K, mounted on pivot-pin H and connected with tail-board A of cart and pedestals, levers O O, pivoted to bottom of cart and tail-board, springs N N, and a spring locking device holding down cart in front, all as and for the purposes described.

6. In a dumping-cart, pedestals interposed between the body of the cart and the axle which passes through and carries them, formed with inner and outer sliding shells holding springs, having on their upper ends, in front, sockets to receive ends of shafts and in rear ears, through which passes pivot-pin, all as herein set forth.

7. The combination, with the body A, pivoted to spring-pedestals B B, mounted on axles C C, of the springs N N, connected with said body and the pedestals.

LEWIS S. BROWNING.

Witnesses:
WILL. P. McFEAT,
FRED. J. SEARS.